United States Patent [19]

Einarsson

[11] 3,712,358
[45] Jan. 23, 1973

[54] PNEUMATIC ANTI-SKID VEHICLE TIRE

[76] Inventor: Einar Einarsson, Mavahlio 8, Reykjavik, Iceland

[22] Filed: Sept. 8, 1970

[21] Appl. No.: 70,324

[52] U.S. Cl. .................................................. 152/208
[51] Int. Cl. ............................................... B60c 11/00
[58] Field of Search ............... 152/418, 332, 208, 340

[56] References Cited

UNITED STATES PATENTS

| | | | |
|---|---|---|---|
| 2,491,491 | 12/1949 | Freygang | 152/208 |
| 3,511,294 | 5/1970 | Bepristis et al. | 152/418 |
| 2,835,302 | 5/1958 | Gedge | 152/208 |
| 2,781,813 | 2/1957 | Ferguson | 152/208 |
| 2,708,470 | 5/1955 | Gramelspacher | 152/208 |
| 2,941,566 | 6/1960 | Prince | 152/208 |
| 2,841,199 | 7/1958 | Voelkel et al. | 152/208 |
| 2,888,056 | 5/1959 | Zahlten | 152/208 |
| 3,516,466 | 6/1970 | Smit | 152/208 |
| 3,095,918 | 7/1963 | Mike | 152/208 |
| 3,480,064 | 11/1969 | Huber | 152/340 |

Primary Examiner—Drayton E. Hoffman
Assistant Examiner—Richard A. Bertsch
Attorney—Kinzer, Dorn & Zickert

[57] ABSTRACT

The anti-skid vehicle tire includes studs mounted in the tread wall and movable between extended road engaging and retracted non-road engaging positions, high and low pressure chambers within the tire wherein the low pressure chamber maintains the tire in inflated condition, pressure responsive expansible means coacting with the studs to control stud position, and valve means for selectively intercommunicating the expansible means with the high pressure air chamber and atmosphere to retract and extend the studs.

16 Claims, 18 Drawing Figures

INVENTOR
EINAR EINARSSON

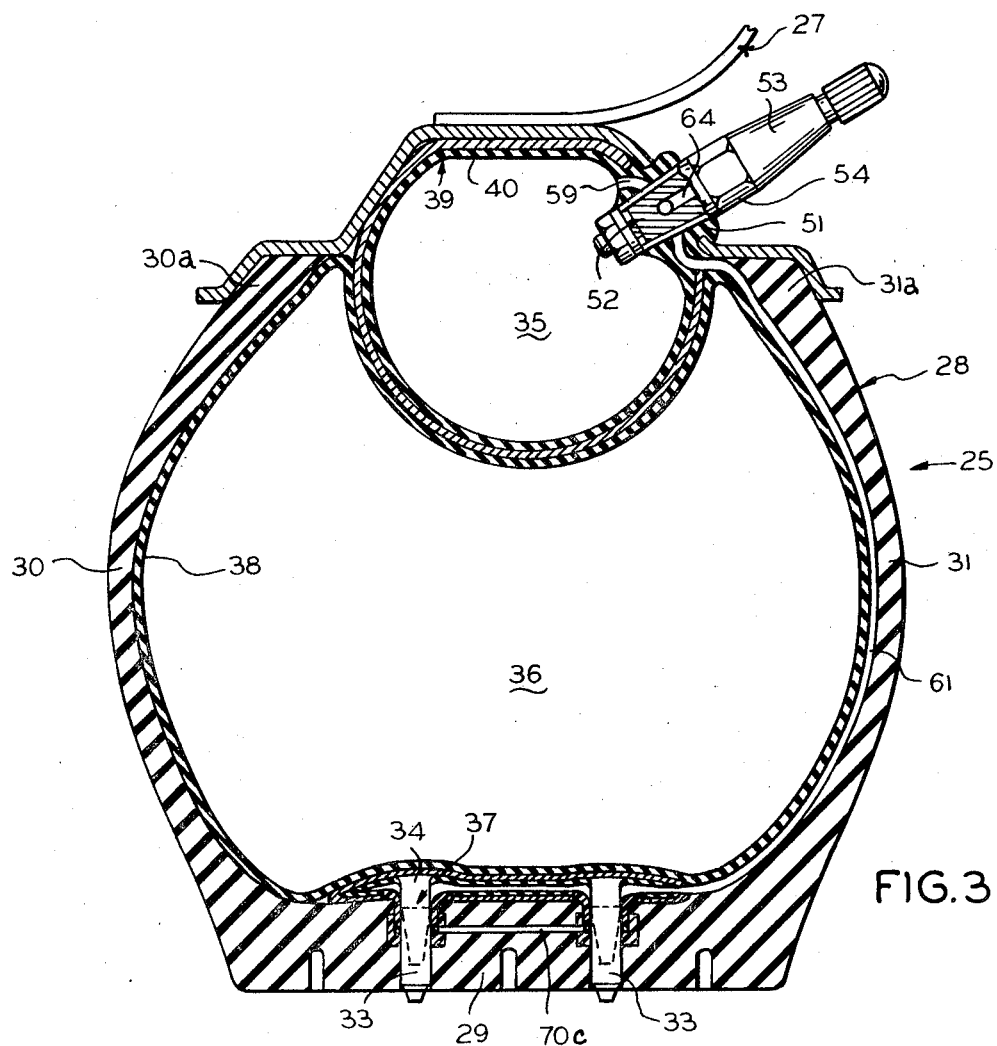
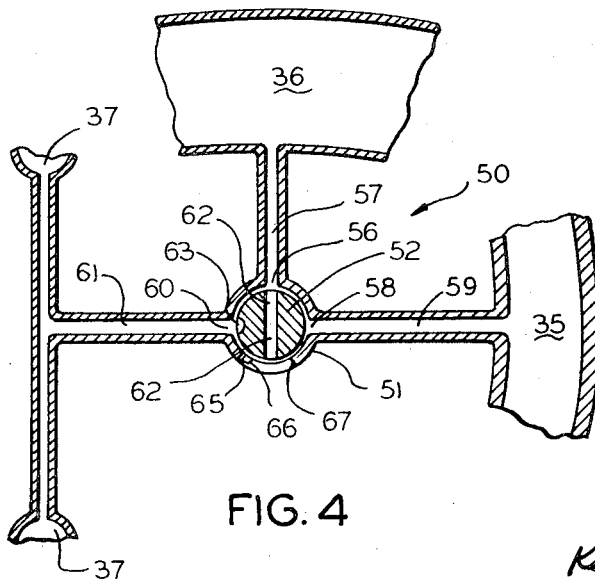
FIG. 3
FIG. 4

INVENTOR
EINAR EINARSSON

INVENTOR
EINAR EINARSSON

INVENTOR.
EINAR EINARSSON.

PNEUMATIC ANTI-SKID VEHICLE TIRE

This invention relates in general to a pneumatic anti-skid vehicle tire and more particularly to an anti-skid vehicle tire having the studs in the tread wall movable between road engaging and non-road engaging positions by a self-contained power unit.

Heretofore, it has been well known to have power-operated retractable studs in anti-skid vehicle tires, but the power means for controlling said position has depended upon an external power source which would not normally be carried with the vehicle. Accordingly, the vehicle operator would be inconvenienced in seeking out the needed power source in order to change position of the studs.

The present invention overcomes the difficulties heretofore known in that it provides a vehicle tire carrying its own power source for controlling position of studs mounted in the tread wall between road engaging and non-road engaging position. Specifically, the vehicle tire of the invention includes a high pressure air chamber and a low pressure air chamber within the casing of the tire, together with air pressure responsive means operable to control stud position. Energization of the air pressure expansible means by connecting it to the high pressure chamber causes retraction of the studs to non-road engaging position, while de-engerization of the air chamber expansible means by connecting same to atmosphere causes extension of the studs to road engaging position. A valve means is mounted on the rim of the wheel carrying tire to control operation of the air pressure responsive means, and the extension and retraction of the studs, which valve can be easily actuated by the operator of the vehicle. Since a power supply is always available for controlling stud position, the operator of the vehicle can at all times, no matter where located, change stud position. Thus, where road conditions suggest the use of studs, the operator can readily convert his tires to a stud type tire; and when the studs are no longer needed, and it is better to run without them, the operator can easily cause the studs to be retracted into non-road engaging position.

It is therefore an object of the present invention to provide a new and improved anti-skid vehicle tire.

Another object of the invention resides in the provision of an anti-skid vehicle tire having studs along the tread wall movable between road engaging and non-road engaging positions, and wherein a self-contained power supply is included in the tire to enable the operator to readily convert the tire to the condition needed by simply actuating a valve.

A still further object of the present invention is in the provision of an anti-skid vehicle tire having studs in the tread wall movable between road engaging and non-road engaging positions and having high and low pressure chambers within the tire casing wherein the high pressure chamber is employed for controlling stud position.

Other objects, features and advantages of the invention will be apparent from the following detailed disclosure taken in conjunction with the accompanying sheets of drawings, wherein like reference numerals refer to like parts, in which:

FIG. 3 is a view similar to FIG. 1, but showing the studs in extended road engaging position and the control valve positioned to effect same;

FIG. 4 is a view similar to FIG. 2 and illustrating the valve in position for maintaining the studs in extended road engaging position;

Figure 1:
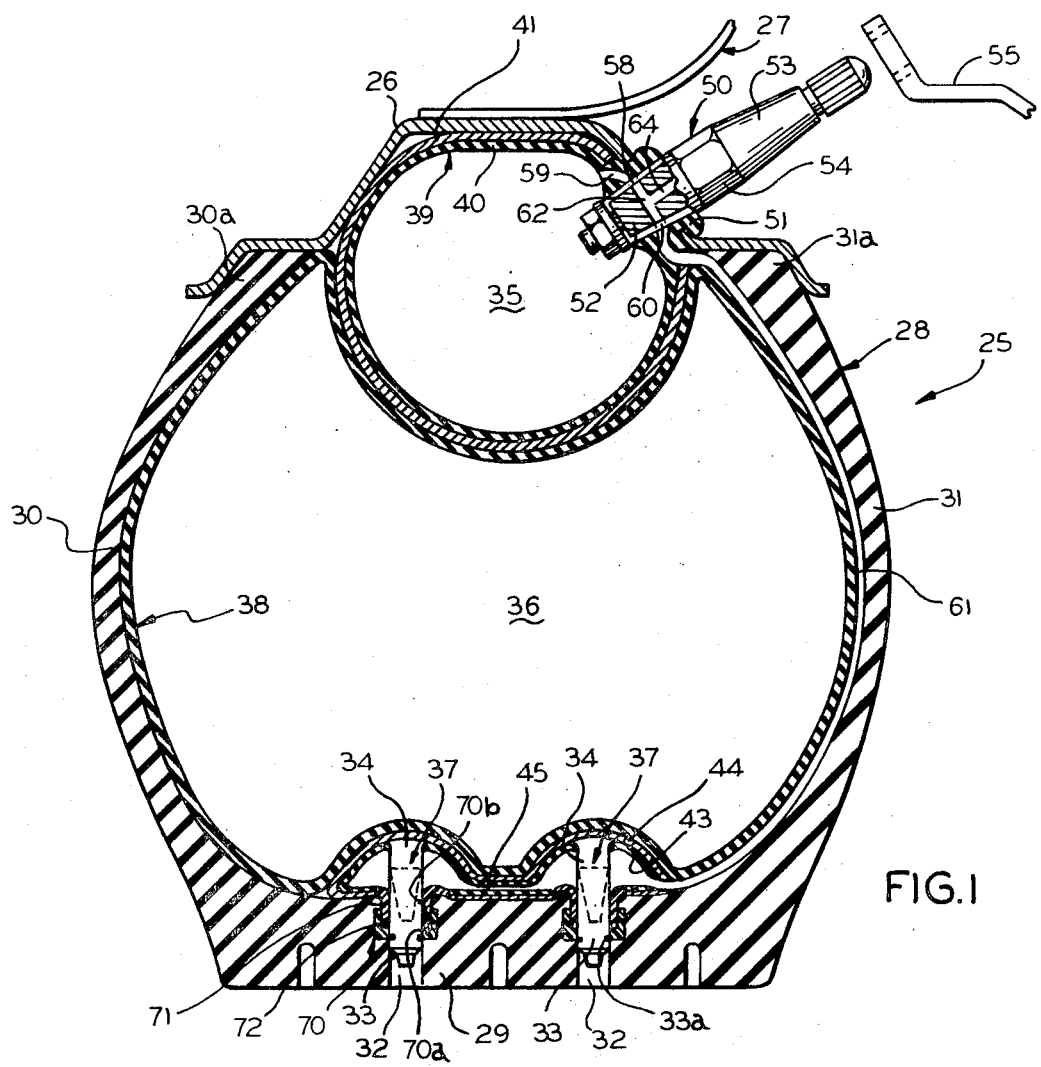
FIG. 1 is a transverse sectional view taken through a tube-type vehicle tire mounted on a wheel rim and employing the present invention, and illustrating the studs in retracted position.

Referring now to the drawings, and particularly to the embodiments of FIGS. 1 to 5, the anti-skid vehicle tire of the invention in the form of a tube-type tire generally designated by the numeral 25, is illustrated in mounting relation on the rim 26 of a vehicle wheel 27.

The tire 25 includes a tire casing 28 having a peripheral tread wall 29, opposed side wheels 30 and 31, the the latter of which terminate in beads 30a and 31a which engage the wheel rim 26 in sealing relation. A plurality of stud holes or apertures 32 are formed in the tread wall 29, there being only two such holes illustrated in FIGS. 1 and 3, although it should be understood that any number of holes or studs would be provided circumferentially of the tire. While a pair of stud holes are shown in side by side relation, it should be recognized that a single stud may appear at any one point or a number greater than two could be arranged in side by side relation. Studs 33 are movably mounted within the stud holes 32, and it can be appreciated that the studs may be made of any suitable material such as tungsten, carbide or the like. Further, the studs may be removably mounted on bases 34, it then being possible to replace broken studs. Further, an annular groove 33a may be provided in the stud at a point spaced from the terminal end to define a weakened portion so that the stud will break instead of bend, if under undue strain, and thereby not inhibit movement of the studs in the stud holes.

Within the tire casing 28, a high pressure chamber 35 and a low pressure chamber 36 are defined by individual tubes. Air pressure responsive expansible pockets 37 coact with the studs to control stud position.

Figure 8:
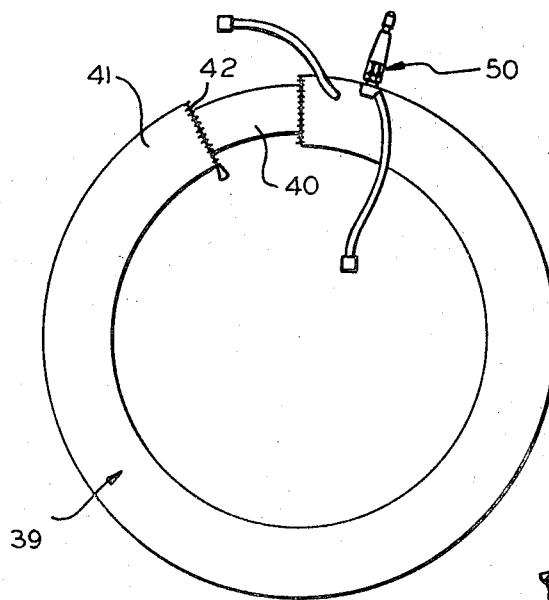
FIG. 8 is a plan view of the high pressure tube employed with the embodiment of FIG. 6 or the embodiment of FIG. 1, and illustrating the separation of the outer rigidifying cover to enable mounting on a wheel rim.

The tire 25 being tube-type includes a conventional rubber tube 38 for defining the low pressure chamber 36. A high pressure tube 39 defines the high pressure chamber 35, and this tube includes an inner rubber or the like wall or layer 40 and an outer rigidifying or confining wall 41 of nylon or suitable fabric material which limits the expansion of the tube 39. In order to facilitate the mounting of the high pressure tube 39 on the wheel rim and within the tire casing, it is necessary to permit separation of the nylon cover 41 in a suitable manner, such as shown in FIG. 8 by means of a zipper 42.

Figure 5:
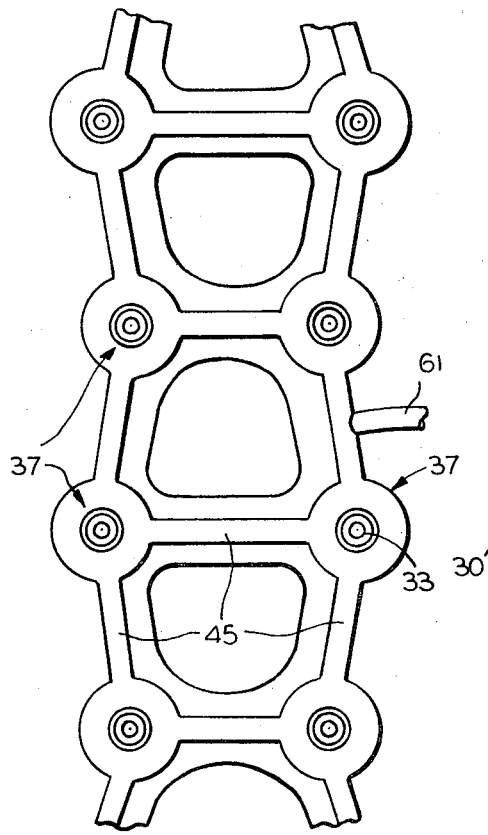
FIG. 5 is a fragmentary plan view of the air pressure responsive expansible means for controlling stud position for the embodiment of FIGS. 1 to 4.

The pockets 37, one for each stud, are constructed similarly to the high pressure tube 39 to limit expansion upon being subject to the high pressure from the high pressure chamber 35, and accordingly, each pocket includes an inner rubber line 43 and outer fabric cover 44. The stud base 34 is suitably connected to the rubber liner 43, and the stud base may be of molded plastic such as nylon, Delrin and the like. As seen in FIG. 5, each of the pockets 37 are connected by a network of passageways 45 so that air pressure delivered to the network will substantially simultaneously energize each of the air pockets by expanding same and causing retraction of the studs 33.

A control valve 50 is provided to control stud movement, and to permit admission of air under pressure into the high and low pressure chambers. The valve includes a body 51 within which is rotatably mounted a plug 52. The plug has a stem 53 extending outwardly therefrom and on which is formed a wrench face 54 for receiving a socket wrench 55 to be used by the operator of the vehicle for effecting rotation of the plug 52. It should also be appreciated that power operated means may be employed for rotating the plug, which means could be controlled from within the vehicle. The body includes a port 56 interconnected to the low pressure chamber 36 through an air line 57, FIG. 2, a port 58 interconnected to the high pressure chamber 35 through an air line 59, and a port 60 interconnected to the network of pockets 37 of the air pressure responsive expansible means by an air line 61. The plug 52 includes a passageway 62 extending transversely therethrough and capable of aligning simultaneously with ports 58 and 60, and individually with port 56. A vent passageway 63, communicating with the atmosphere, is provided in the plug 52 and capable of aligning with port 60 for the purpose of venting pockets 37 to atmosphere to permit deflation. Within the stem 53, a conventional valve core, not shown, is provided to provide admission of air into the tire and seal against deflation, and the valve core discharge end is interconnected to the passageway 62 by a passageway 64. A lug 65 is provided on the plug 52 to coact with stops 66 and 67 on the body 51 to respectively position the plug as shown in FIGS. 2 and 4, whereby the plug passageway 62 aligns with the ports 58 and 60 when the lug abuts stop 67, and the vent 63 aligns with the port 60 when the lug abuts stop 65.

Figure 2:
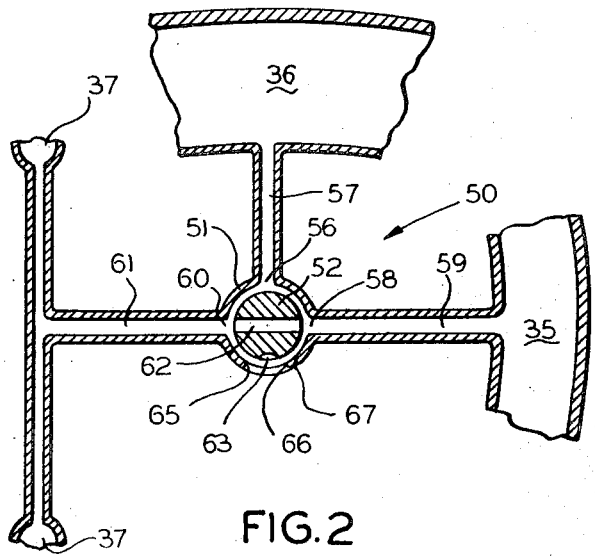
FIG. 2 is a diagrammatic view of the control valve and pressure chambers, wherein the control valve is positioned like in FIG. 1 to maintain the studs in retracted position.

In operation, assuming that the low and high pressure chambers are substantially at the predetermined capacity pressure level, where the valve 50 is in the position shown in FIGS. 1 and 2, the air line 61 is in communication with the air line 59 through the plug passageway 62, thereby intercommunicating the high pressure chamber 35 with the pockets 37. This expands the pockets as shown in FIG. 1 to cause retraction of the studs 33. Rotation of the valve plug 52 so that the lug 65 abuts against the stop 66 first disconnects the high pressure chamber from the pockets 37, and then vents the pockets 37 to atmosphere through the vent passageway 63 which is then in alignment with the pockets port 60. Use of the wrench 55 enables actuation of the valve 50 and upon venting of the pockets 37, the pressure in the low pressure chamber 36 acts against the stud bases 34 to extend the studs to road engaging position as shown in FIG. 3. When filling the low pressure chamber with air to the desired pressure, the valve 50 is in the position shown in FIG. 4, and when filling the high pressure chamber 35 to the desired pressure level, the valve 50 is in the position shown in FIG. 2.

Inasmuch as the inner end of each stud 33 extends into the chamber of the respective control pocket 37, sealing means is provided to prevent the escape of air pressure from the pockets, in the form of a bushing 70 which is positioned in a socket formed in the tread wall 29 adjacent the inner end of the stud hole 32. The bushing includes a stud bore 70a through which the stud slides and a counterbore 70b in which a sleeve 71 formed integrally with the pocket and an O-ring gasket 72 are received to define an air seal about the stud. The counterbore of the bushing telescopically receives the sleeve 71, the bottom of which seats the O-ring gasket. When the pockets are in expanded condition, the air pressure forces the sleeve 71 deeper into the counterbore of the bushing 70 to expand the O-ring into sealing relation between the sleeve and stud. The bushing are made of a suitable hard plastic, such as nylon or the like. Similarly the sleeves are made of a hard plastic. The bushings 70 may be individually molded and inserted in the tire as shown in FIG. 1, or molded in pairs and connected together by a link 70c as shown in FIG. 3.

Figure 6:
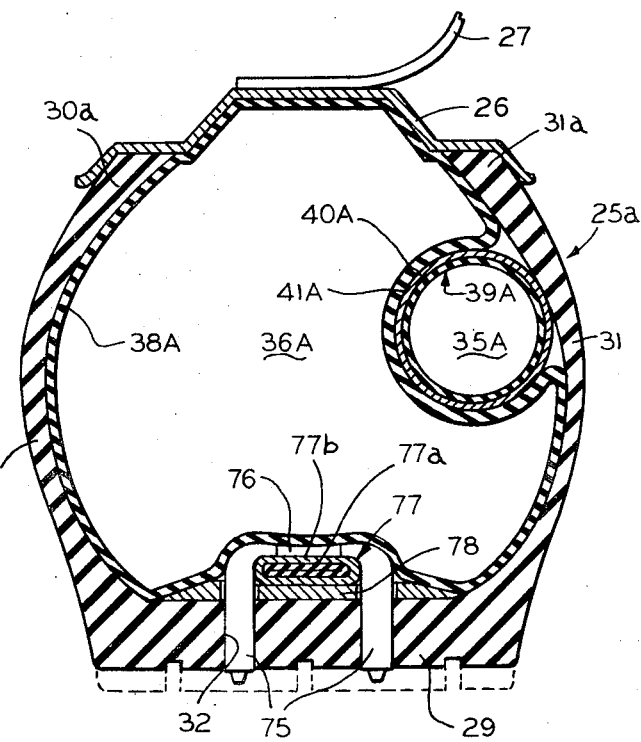
FIG. 6 is a transverse sectional view of a further embodiment of the invention, and also illustrating the use of a spacer compensating for tread wear to maintain the studs in retracted position.
Figure 7:
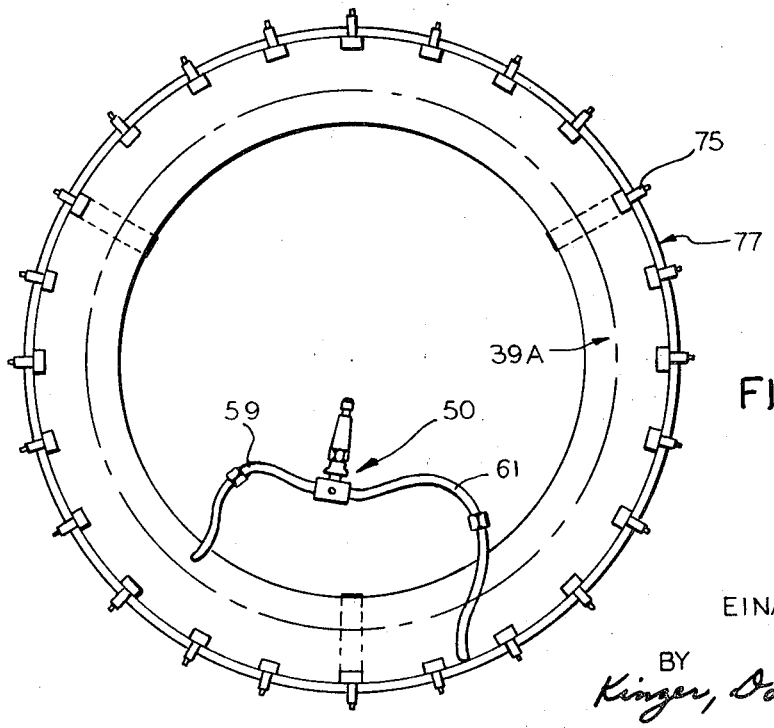
FIG. 7 is a plan view of the pressure tubes, pressure responsive expansible means and valve arrangement, employed with the embodiment of FIG. 6.

The embodiment of FIG. 6 principally differs from the embodiments of FIGS. 1 to 5 in that the tubular high pressure chamber 35A is located along the side wall 31 of the tire casing. This embodiment is generally designated by the numeral 25A, although identical numerals will be used with respect to the tire casing. The low pressure chamber 36A is again defined by a rubber tube 38A, while the high pressure chamber 35A is defined by tube 39A having an inner rubber liner 40A and an outer fabric cover 41A limiting expansion.

Further, the studs, here designated by numeral 75, are arranged in pairs connected together by a cross bar 76 within the tire casing. Between the cross bars 76 of the stud pairs and the tread wall 29, an expansible tube 77 is provided to control the positions of the studs. The tube 77 is constructed in the same manner as the high pressure tube 39A in that it includes an inner rubber liner 77a and an outer fabric cover 77b to limit the expansion thereof.

Figure 9:
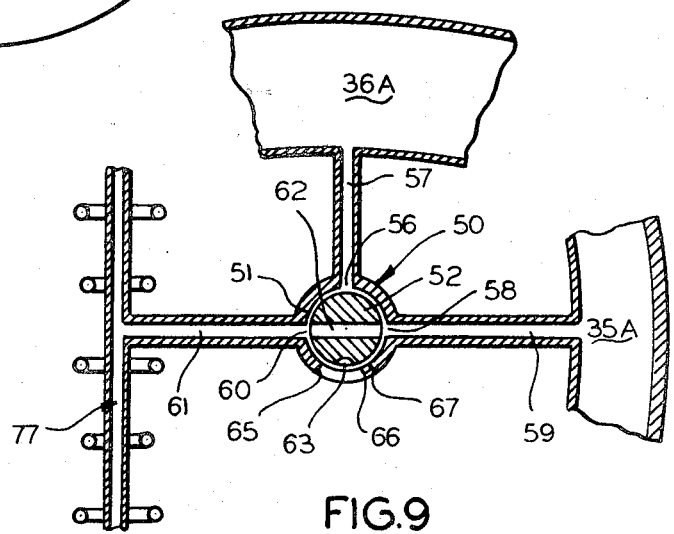
FIG. 9 is a diagrammatic view illustrating the valve position for the embodiment of FIG. 6 to cause retraction of the studs.
Figure 10:
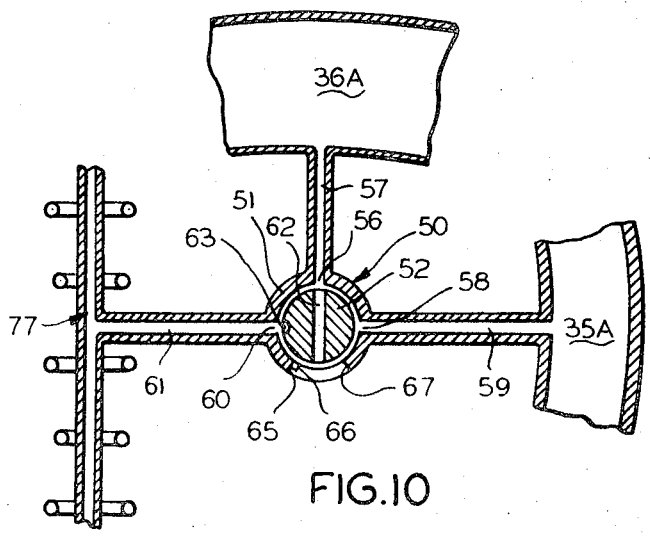
FIG. 10 is a view similar to FIG. 9 but illustrating the valve position to cause extension of the studs.
Figure 11:
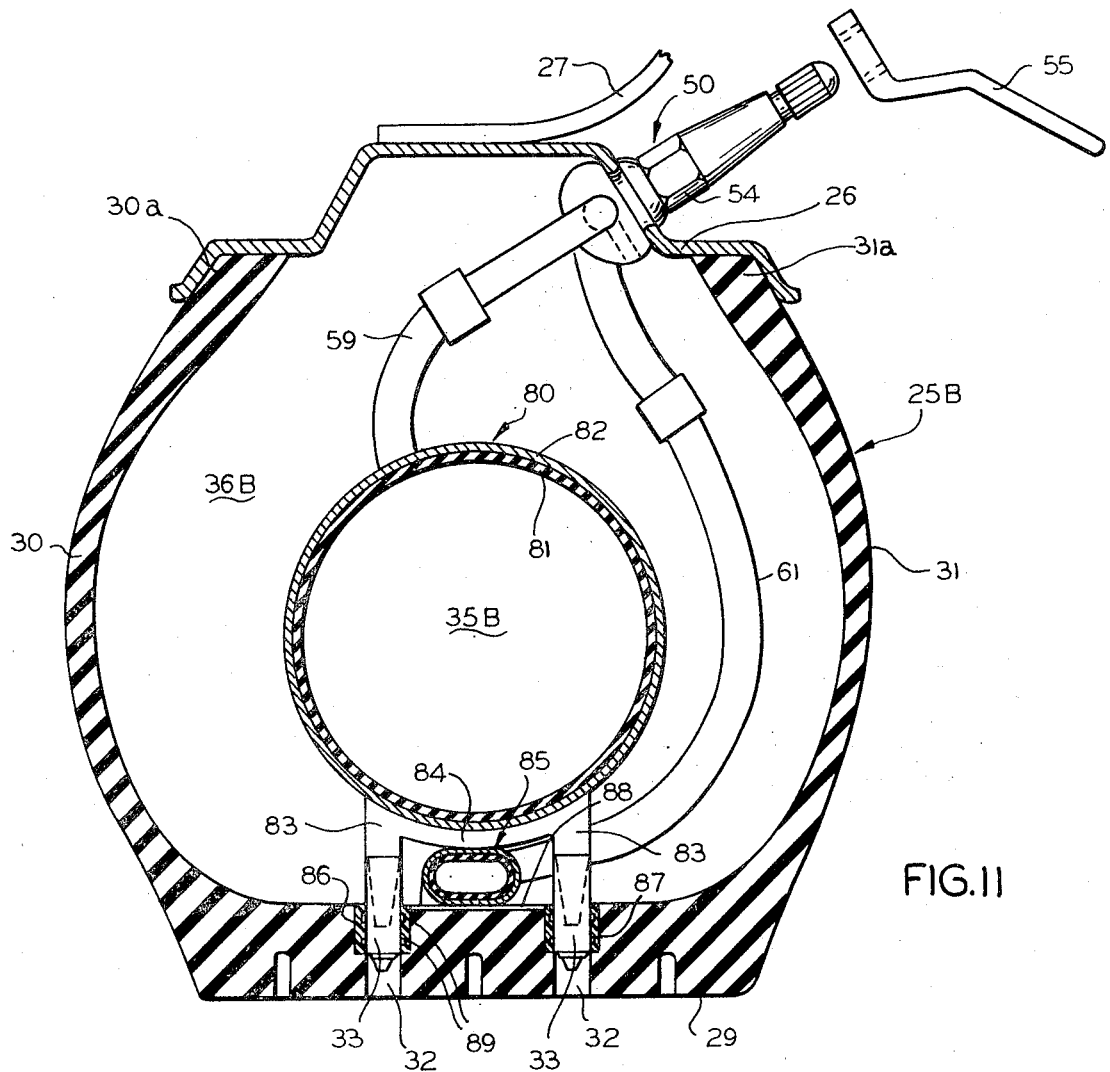
FIG. 11 is a transverse sectional view taken through a tubeless tire and a wheel rim illustrating the present invention, and with the studs in retracted position.

The control valve and control of stud position by regulation of high pressure to the tube 77 of this embodiment is identical to that used in the embodiment of FIGS. 1 to 5, and therefore like numerals will be used. Similarly, air lines are provided from the same ports to the high pressure chamber 35A, the low pressure chamber 36A and the expansible tube 77. As seen in FIGS. 9 and 10, the valve positions reflect respectively stud retraction and stud extension in the same manner as in the first embodiment.

Inasmuch as the tread on the tread wall will wear away, as illustrated in dotted and solid lines in FIG. 6, it becomes necessary to compensate for the thinner wall in order to keep the studs in retracted position when that is desired; and to do so, a spacing pad 78 may be arranged between the tread wall 29 and the tube 77.

Application of the present invention to tubeless tires is illustrated in the embodiment of FIGS. 11 to 15. Like numerals are used in identifying the tire casing, although it will be appreciated that a tubeless tire is presented. Moreover, like numerals are used to represent the control valve 50, although it will be of a type that is especially suitable for use with tubeless tires and therefore in sealing arrangement with the wheel rim 26. This embodiment is generally designated by the numeral 25B, while the low pressure chamber is designated as 36B and the high pressure chamber is designated as 35B. The low pressure chamber 36B is defined by the tire casing and the rim 26 of the wheel 27, while the high pressure chamber 35B is defined by a tube 80 of a similar type already described in the first embodiments which has limited expansion characteristics. Specifically, this tube 80 will include an inner layer of rubber 81 and outer fabric cover 82 which will restrict expansion of the rubber liner as in the previous embodiments.

Figure 12:
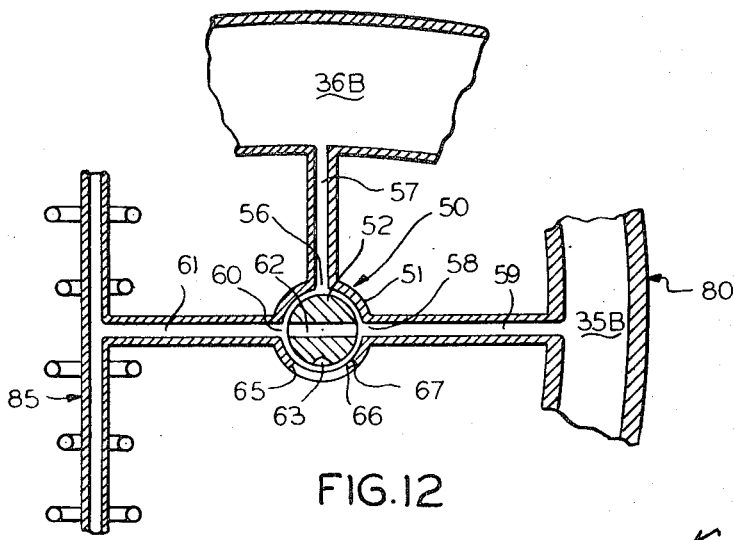
FIG. 12 is a diagrammatic view of the valve in position to cause retraction of the studs of the embodiment of FIG. 11.
Figure 13:
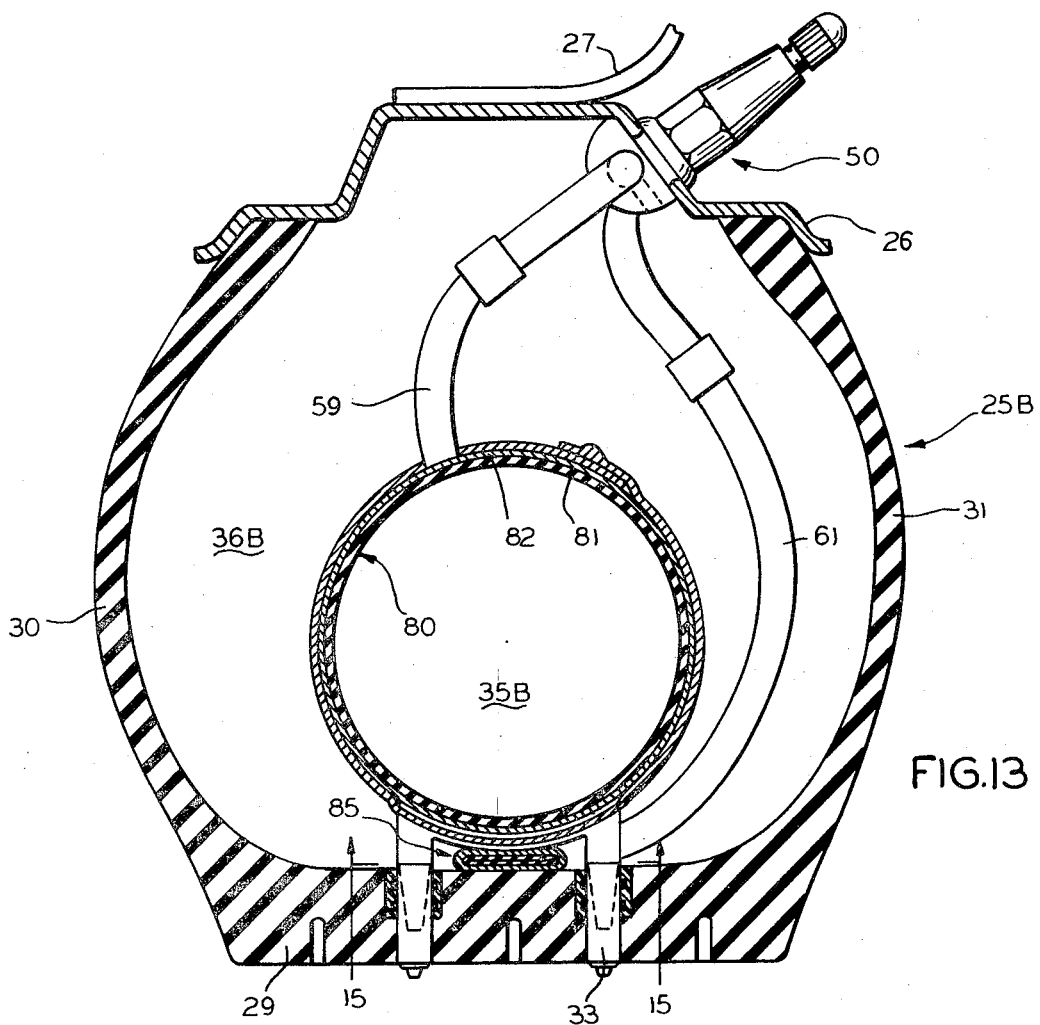
FIG. 13 is a view similar to FIG. 11, but illustrating the studs in extended road engaging position.
Figure 14:
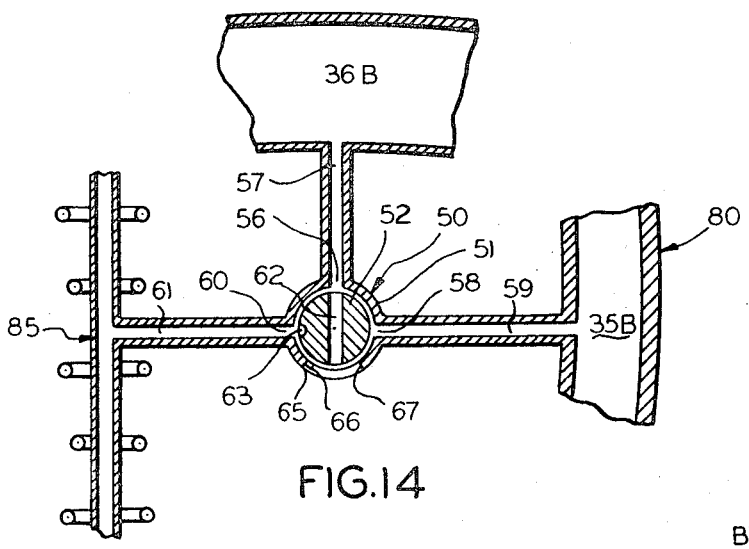
FIG. 14 is a view similar to FIG. 12 but illustrating the position of the valve to cause the studs to extend as in FIG. 13.
Figure 15:
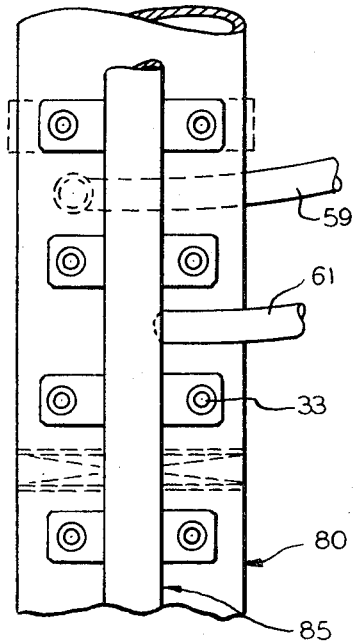
FIG. 15 is a fragmentary view of the air pressure responsive expansible means and the high pressure tube, taken substantially along line 15—15 of FIG. 13.

In this embodiment, each pair of studs 33 are supported by base portions 83 interconnected by a cross bar 84 which is arranged adjacent the exterior of the high pressure tube 80. Between the cross bar 84 and the tread wall 29, an air pressure responsive expansible tube 85 of the same type as set forth in the embodiment of FIG. 6 is provided for controlling the stud position. The air line connections between the valve 50, the high and low pressure chambers and the expansible tube, as seen particularly in FIGS. 12 and 14, are identical to the heretofore described embodiments and especially as shown in the previous embodiment illustrated in FIGS. 9 and 10. The operation of this embodiment is identical to the operation of the tire of the previous embodiments; and FIG. 12 represents valve position when the studs are retracted, while FIG. 14 represents valve position when the studs are extended.

Each aligned pair of studs is provided with connected sealing sleeves 86 and 87 set into counterbores aligned with the stud holes 32 at the inside surface of the tread wall 29, and through which the studs move. The sleeves 86 and 87 as illustrated are connected by a web 88, although it should be appreciated that the sleeves may be individual and not connected. The sleeves are constructed of a suitable rigid plastic such as nylon or the like, and O-rings 89 are received by the sleeves to coact with the sleeves and studs to seal against loss of air along the studs.

Figure 16:
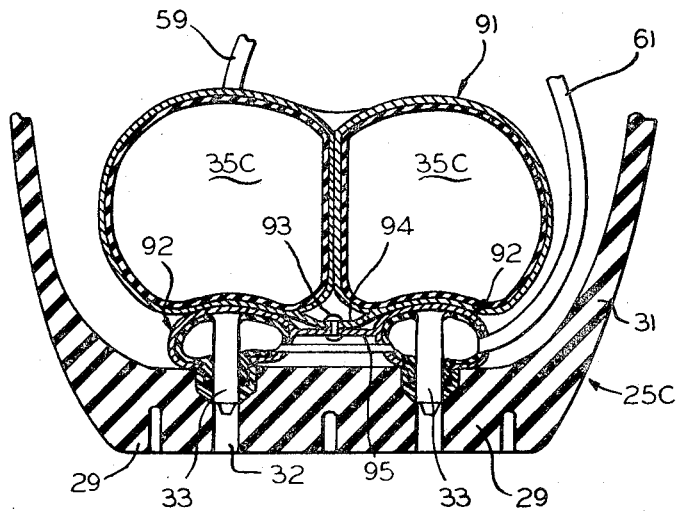
FIG. 16 is a fragmentary transverse sectional view of a tire according to the invention and illustrating a further embodiment for tubeless tires.

Another form of the invention relative to tubeless tires is illustrated in FIG. 16, this embodiment being designated as 25C, and which differs from the embodiments of FIGS. 11 to 15 in that a double expansible tube 91 is provided for defining the high pressure chamber 35C and to coact with pockets 92 defining expansible chambers for controlling the position of studs 33. The pockets 92 are separate from the double tube 91, and are essentially of the same construction as the pockets 37 shown in the embodiment of FIGS. 1 to 5. Similarly, the sealing arrangement for the studs to prevent loss of air pressure from the pockets when they are energized is substantially the same as that shown in the embodiment of FIGS. 1 to 5. The pockets 92 are connected to the double tube 91 by means of a plurality of fasteners 93 which connect tube straps 94 with pocket straps 95. The operation of this embodiment is the same as the embodiment of FIGS. 11 to 15.

Figure 17:
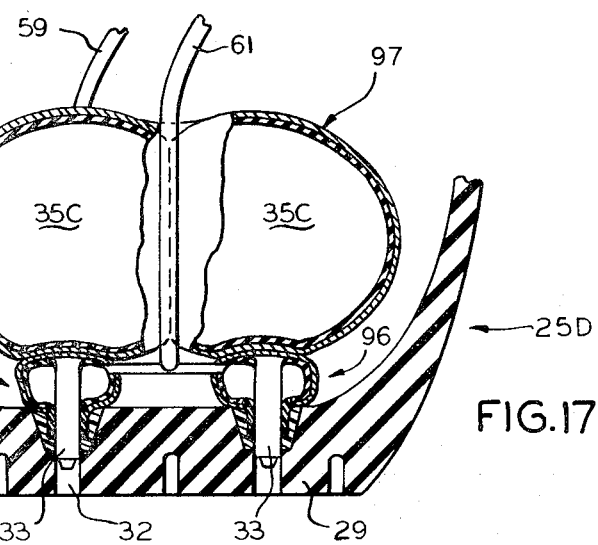
FIG. 17 is a view similar to FIG. 16, but illustrating a still further embodiment of the invention.
Figure 18:
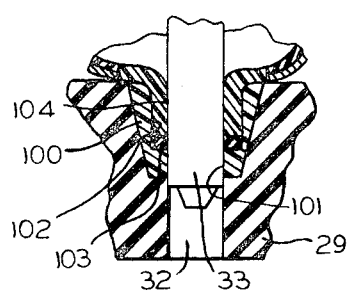
FIG. 18 is an enlarged detail sectional view, taken through the stud seal of FIG. 17 that may be used with any of the embodiments illustrated.

The embodiment of FIG. 17 is similar to the embodiment of FIG. 16, but differs primarily in that the expansible pockets 96 are integrally formed with the high pressure tube 97. The operation of this embodiment is the same as the embodiment of FIG. 16. Moreover, the stud sealing arrangement is essentially the same. Each sealing arrangement, FIG. 18, includes a bushing 100 of hard plastic material set in a socket formed in the tread wall 29. The outer periphery of the bushing is tapered and therefore can be wedged into the tread wall. A stud bore 101 is provided centrally through the bushing at the lower end, and thereabove a counterbore 102 receives an O-ring 103 and a hard plastic sleeve 104 extending from the pocket 96. Sealing when the pockets are connected to the high pressure chamber 35c is the same as the embodiment of FIGS. 1–5.

It will be understood that modifications and variations may be effected without departing from the scope of the novel concepts of the present invention, but it is understood that this application is to be limited only by the scope of the appended claims.

This invention is hereby claimed as follows:

1. A pneumatic anti-skid vehicle tire comprising, a tire casing adapted to be mounted on a wheel rim having a peripheral tread wall, a plurality of stud holes in said tread wall, studs in said holes movable therein between extended road engaging and retracted non-road engaging positions, self-contained power means within said tire casing operable to selectively cause extension or retraction of said studs, said means including a high pressure air chamber and a low pressure air chamber, the low pressure air chamber maintaining the tire inflated, air pressure responsive expansible means coacting with said studs and said high pressure air chamber to control stud position, and control means for selectively intercommunicating the expansible means with the high pressure air chamber to cause expansion thereof and retraction of the studs or with the atmosphere to cause collapse thereof and extension of the studs.

2. A pneumatic anti-skid vehicle tire as defined in claim 1, wherein said tire is tube-type, said low pressure chamber defined by an expansible air tube that maintains the tire inflated, and said high pressure chamber defined by an air tube within the tube capable of limited expansion.

3. A pneumatic anti-skid vehicle tire as defined in claim 1, wherein said tire is tubeless, said low pressure chamber defined by the tire casing and wheel rim, and said high pressure chamber defined by an air tube within the tire capable of limited expansion.

4. A pneumatic anti-skid vehicle tire as defined in claim 1, wherein each stud has a weakened portion at a point spaced from the free end which permits the stud to break in response to undue bending stress.

5. A pneumatic anti-skid vehicle tire as defined in claim 1, wherein said control means includes a valve mounted on the wheel rim.

6. A pneumatic anti-skid vehicle tire as defined in claim 5, wherein said valve includes means for admitting air under pressure into the high pressure and low pressure air chambers.

7. A pneumatic anti-skid vehicle tire as defined in claim 6, wherein said air pressure responsive expansible means includes a plurality of air pockets, one for each stud, air passageway means intercommunicating each of said air pockets with each other, said air pockets being defined by opposed flexible walls sealed peripherally and having a limited expansion.

8. A pneumatic anti-skid vehicle tire as defined in claim 7, wherein an opening is provided in one wall of the air pocket aligning with a stud hole in the tire casing and through which the stud extends, means securing the base of the stud to the other wall of the air pocket, and means for sealing the stud and tire casing together with said one wall of the air pocket against air leakage from the air pocket.

9. A pneumatic anti-skid vehicle tire as defined in claim 8, wherein said sealing means includes a bushing in the tread wall through which the stud extends, said bushing having a bore through which the stud matingly extends and a counterbore having a wall defining a space with the stud, a sleeve extending from said one air pocket wall and into the bushing counterbore, and a resilient O-ring at the bottom of the counterbore being compressed by the sleeve into sealing engagement between the bushing and stud.

10. A pneumatic anti-skid vehicle tire as defined in claim 6, wherein said valve is movable between a first position for intercommunicating the expansible means and high pressure chamber to inflate same and retract the studs and a second position for closing the high pressure chamber and intercommunicating the expansible means to atmosphere to deflate same and cause the studs to move into extended road engaging position.

11. A pneumatic anti-skid vehicle tire as defined in claim 6, wherein said air pressure responsive expansible means includes an air tube capable of restricted expansion and arranged to coact with the studs.

12. A pneumatic anti-skid vehicle tire as defined in claim 11, wherein the studs are arranged in pairs with a cross bar within the casing at the tread wall and said air tube is positioned between the tread wall and cross bar of each stud pair.

13. A pneumatic anti-skid vehicle tire as defined in claim 1, wherein said high pressure chamber is defined by an air tube arranged within the tire casing and capable of limited expansion.

14. A pneumatic anti-skid vehicle tire as defined in claim 13, wherein said air tube includes an inner rubber tube encased in an outer fabric tube.

15. A pneumatic anti-skid vehicle tire as defined in claim 14, wherein the air tube has a cross section substantially less than that of the tire and is positioned along the rim.

16. A pneumatic anti-skid vehicle tire as defined in claim 14, wherein the air tube has a cross section substantially less than that of the tire and is positioned along a side wall of the tire.

* * * * *